(12) United States Patent
Patterson et al.

(10) Patent No.: US 8,671,974 B2
(45) Date of Patent: Mar. 18, 2014

(54) FLOW-ACTUATED ACTUATOR AND METHOD

(75) Inventors: Richard Patterson, Houston, TX (US); Gary B. Lake, Houston, TX (US); Yang Xu, Houston, TX (US); Terry R. Bussear, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 591 days.

(21) Appl. No.: 12/469,288

(22) Filed: May 20, 2009

(65) Prior Publication Data

US 2010/0294370 A1 Nov. 25, 2010

(51) Int. Cl.
*F16K 31/12* (2006.01)

(52) U.S. Cl.
USPC ......... 137/504; 137/496; 137/497; 166/332.8

(58) Field of Classification Search
USPC ........ 137/455, 467, 496, 497, 504; 166/332.8
See application file for complete search history.

(56) References Cited

U.S. PATENT DOCUMENTS

| | | | |
|---|---|---|---|
| 2,256,119 A * | 9/1941 | Lillich | 137/454.2 |
| 2,874,785 A * | 2/1959 | Muse | 166/320 |
| 3,151,839 A | 10/1964 | Mott | |
| 3,685,538 A * | 8/1972 | Sullivan | 137/504 |
| 3,973,586 A | 8/1976 | Hill et al. | |
| 4,161,219 A | 7/1979 | Pringle | |
| 4,215,748 A | 8/1980 | Pace et al. | |
| 4,274,490 A | 6/1981 | Huckaby | |
| 4,362,214 A | 12/1982 | Pringle et al. | |
| 4,373,587 A | 2/1983 | Pringle | |
| 4,601,342 A | 7/1986 | Pringle | |
| 4,834,183 A | 5/1989 | Vinzant et al. | |
| 4,856,557 A | 8/1989 | Watson | |
| 5,004,007 A | 4/1991 | Johnson et al. | |
| 5,040,606 A | 8/1991 | Hopper | |
| 5,050,839 A | 9/1991 | Dickson et al. | |
| 5,095,994 A * | 3/1992 | Dollison | 166/386 |
| 5,179,973 A | 1/1993 | Dickson et al. | |
| 5,310,005 A | 5/1994 | Dollison | |
| 5,752,569 A | 5/1998 | Bhavsar et al. | |

(Continued)

FOREIGN PATENT DOCUMENTS

| | | |
|---|---|---|
| JP | 2008138812 A | 6/2008 |
| JP | 2004218692 A | 6/2009 |

OTHER PUBLICATIONS

International Search Report and Written Opinion; PCT/US2010/034744; International Searching Authority KIPO; Mailed Jan. 26, 2011.

(Continued)

*Primary Examiner* — Craig Schneider
*Assistant Examiner* — Ian Paquette
(74) *Attorney, Agent, or Firm* — Cantor Colburn LLP

(57) ABSTRACT

Disclosed herein is a flow-actuated actuator. The actuator includes, a tubular with a flow passageway having a first flow area, and at least one movable member in operable communication with the tubular. The at least one movable member is movable relative to the tubular between at least a first position and a second position, the at least one movable member configured to form a second flow area that is smaller than the first flow area when in the second position, the flow-actuated actuator is configured to move a separate member in response to fluid flow therethrough.

21 Claims, 3 Drawing Sheets

(56) References Cited

U.S. PATENT DOCUMENTS

| | | |
|---|---|---|
| 6,302,210 B1 | 10/2001 | Crow et al. |
| 6,367,499 B1 | 4/2002 | Taku |
| 6,394,187 B1 | 5/2002 | Dickson et al. |
| 6,668,935 B1 | 12/2003 | McLoughlin et al. |
| 6,705,082 B2 | 3/2004 | Ju |
| 6,877,564 B2 | 4/2005 | Layton et al. |
| 6,902,006 B2 | 6/2005 | Myerley et al. |
| 7,021,386 B2 | 4/2006 | Vick, Jr. et al. |
| 7,049,996 B1 | 5/2006 | Shen |
| 7,137,452 B2 | 11/2006 | McVicker |
| 7,210,498 B2 | 5/2007 | Arigoni |
| 7,213,653 B2 | 5/2007 | Vick, Jr. |
| 7,219,496 B2 | 5/2007 | Grabenstaetter |
| 7,270,191 B2 | 9/2007 | Drummond et al. |
| 7,347,270 B2 | 3/2008 | McMillan et al. |
| 7,363,980 B2 | 4/2008 | Pringle |
| 2001/0007284 A1 | 7/2001 | French et al. |
| 2006/0070744 A1 | 4/2006 | Smith |
| 2006/0124315 A1* | 6/2006 | Frazier et al. ............... 166/369 |
| 2006/0162939 A1 | 7/2006 | Vick, Jr. et al. |
| 2006/0283506 A1* | 12/2006 | Sesser et al. ............ 137/505.25 |
| 2007/0137869 A1 | 6/2007 | MacDougall et al. |
| 2007/0295515 A1 | 12/2007 | Veneruso et al. |
| 2008/0164035 A1 | 7/2008 | Bolding et al. |
| 2008/0196898 A1 | 8/2008 | Jasser et al. |
| 2008/0210438 A1 | 9/2008 | Bolding et al. |
| 2008/0230231 A1 | 9/2008 | Bolding et al. |
| 2008/0245531 A1 | 10/2008 | Noske et al. |

OTHER PUBLICATIONS

Pierce, P. E., et al., "Flow Closing Coefficients from Water Flow Tests for Subsurface Controlled Safety Valves (API-SSCSV's)," Fall Meeting of the Society of Petroleum Engineers of AIME, Dallas, Texas, Sep. 28, 1975-Oct. 1, 1975, Paper No. 5601-MS.

Pedigo, John, et al., "An Acoustically Controlled Down-Hole Safety Valve (SCSSSV)," SPE Annual Fall Technical Conference and Exhibition, New Orleans, Louisiana, Oct. 3-6, 1976, Paper No. 6026-MS.

Surbey, D.W., et al., "Study of Subcritical Flow Through Multiple-Orifice Valves," SPE Production Engineering, vol. 3, No. 1, Feb. 1988, Paper No. 14285-PA.

Bolding, J.L., et al., "Damaged Control Line Replacement Safety Valve System: Thru-Tubing," SPE/ICoTA Coiled Tubing & Well Intervention Conference and Exhibition, Mar. 31-Apr. 1, 2009, The Woodlands, Texas, Paper No. 121407-MS.

\* cited by examiner

FLOW-ACTUATED ACTUATOR AND METHOD

BACKGROUND

Downhole system operators are always receptive to new methods and devices to permit actuation of tools located downhole within a downhole system. Increasing flow rates of fluid pumped from surface can and has been harnessed as a method to permit actuation of a number of different types of devices in the downhole environment. In such methods downhole actuators typically use reduced diameter elements that resist fluid flow resulting in actuation forces that are proportional to the flow rate. While these work well for their intended purpose, the reduced diameter elements can limit other operations simply due to diametrical patency. Commonly then such actuators must be removed from the downhole system to allow full bore access. Devices and methods that permit actuation based on flow while not incurring the drawback noted would be well received in the art.

BRIEF DESCRIPTION

Disclosed herein is a flow-actuated actuator. The actuator includes, a tubular with a flow passageway having a first flow area, and at least one movable member in operable communication with the tubular. The at least one movable member is movable relative to the tubular between at least a first position and a second position, the at least one movable member configured to form a second flow area that is smaller than the first flow area when in the second position, the flow-actuated actuator is configured to move a separate member in response to fluid flow therethrough.

Further disclosed herein is a method of actuating a tubular. The method includes, flowing fluid through the tubular, moving a flow resistor with a force generated by the flowing fluid acting on the flow resistor, moving a movable member in operable communication with the tubular from a first position to a second position in response to the moving of the flow resistor, the second position having more resistance to fluid flow than the first position, and moving the tubular with an urging force proportional to fluid flow acting on the movable member in the second position.

Further disclosed herein is a variable flow resistant actuator. The actuator includes, a tubular, at least one member in operable communication with the tubular, having a radially movable portion movable between a first position and a second position, the radially movable portion having a smaller radial dimension in the second position than in the first position, and a biasing member biasing the radially movable portion toward the first position, and the at least one member and the biasing member are configured such that the radially movable portion is movable from the first position to the second position in response to flow therethrough.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
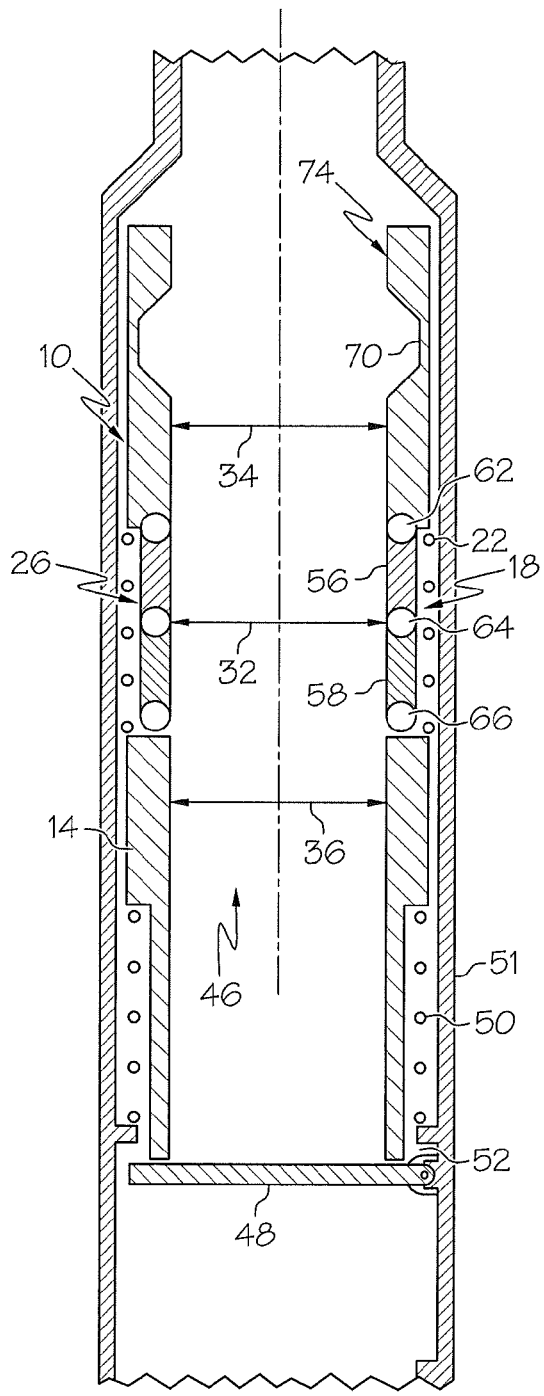
FIG. 1 depicts a partial cross sectional view of a flow-actuated actuator disclosed herein shown in a non-actuated position.
Figure 2:
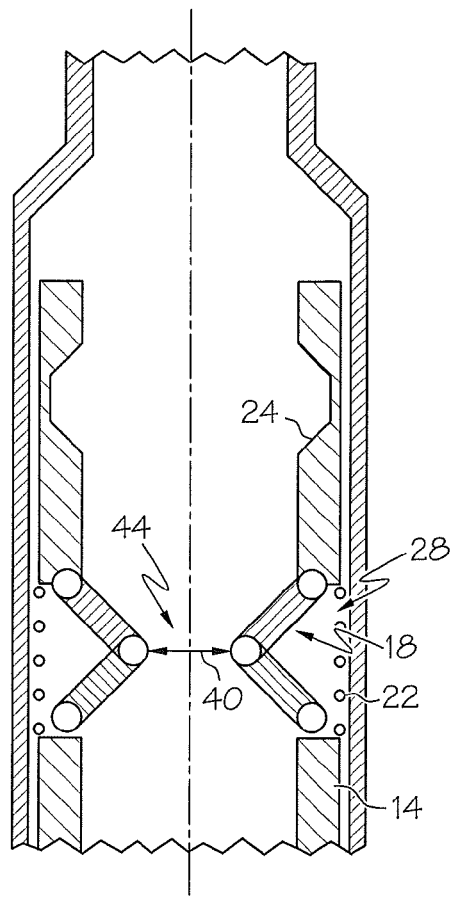
FIG. 2 depicts a partial cross sectional view of the flow-actuated actuator of FIG. 1, shown in a flow actuation position.

Referring to FIGS. 1 and 2, an embodiment of a flow-actuated actuator 10 is illustrated generally at 10. The actuator 10 is a full bore actuator that, when non-actuated does not present its own restriction to flow. Rather the actuator presents an unencumbered full bore. As such, the actuator 10 creates no obstruction to downhole intervention, for example, when in a non-actuating position yet provides a mechanism and method for actuating a downhole tool in response to fluid flow when in an actuating position. Although embodiments depicted herein are in reference to downhole applications, it should be noted that the flow-actuated actuators described herein are not limited to downhole applications, and as such can be used in any application needing a flow-actuated actuator.

The actuator 10 includes, a tubular 14, a movable member 18, a biasing member 22 and a flow resistor 24. The movable member 18 is movable between a first position 26 (shown in FIG. 1), which may also be referred to as the non-actuating position; and a second position 28 (shown in FIG. 2), which may be referred to as the actuating position. The biasing member 22, depicted in this embodiment as a compression spring, biases the movable member 18 toward the first position 26. In the first position 26 neither a minimum radial dimension 32 of the movable member 18 nor a minimum radial dimension 34 of the flow resistor 24 is smaller than a smallest radial dimension 36 of the tubular 14. However, in the second position 28, the movable member 18 has a minimum radial dimension 40 that is substantially smaller than the smallest radial dimension 36 of the tubular 14. As such, the movable member 18 when in the second position 28 forms a reduced flow area 44 at the minimum radial dimension 40 in comparison to a minimum flow area 46 defined by at least one of the flow resistor 24, the movable member 18, when in the first position 26, and the tubular 14. This reduced flow area 44 creates a pressure drop due to fluid flowing, for example, fluid injected from surface, therethrough and consequently an urging force on the actuator 10 that is proportional to the fluid flow. This urging force can be used to move the tubular 14 and actuate a tool such as in opening a flapper 48 sealedly engaged with an outlet end 52 of the tubular 14, for example. A biasing element 50 that biases the tubular 14 relative to a housing 51, illustrated herein as a compression spring, is longitudinally compressed to a smaller longitudinal length when the tubular 14 is moved due to the urging forces.

In this embodiment, the movable member 18 has a plurality of first links 56 and a plurality of second links 58. The first links 56 are pivotally attached to the flow resistor 24 at a first pivot 62 on one end and pivotally attached to the second links 58 at a second pivot 64 at the other end. Similarly, the second links 58 are pivotally attached to the first links 56 at the second pivot 64 at one end and pivotally attached to the tubular 14 at a third pivot 66 at the other end. This construction allows the second pivot 64 to be moved radially inwardly to form the minimum dimension 40 in response to movement of the flow resistor 24 toward the tubular 14, with the biasing member 22 being compressed in the process.

A flow interacting detail 70 on the flow resistor 24, illustrated herein as an annular groove on an inner surface 74 of the flow resistor 24 interacts with the fluid flow to create an urging force on the flow resistor 24 that is proportional to the fluid flow. The interacting detail 70 (as the annular groove illustrates) can be formed without reducing the minimum dimension 34 of the flow resistor 24. Doing so allows full bore access to take place through the actuator 10, as mentioned above, without the need to remove the actuator 10 from the well bore. The biasing member 22 is selected to allow the flow resistor 24 to move relative to the tubular 14 with relatively little urging force applied to the flow resistor 24. Once the flow resistor 24 begins moving toward the tubular 14 the urging force on the flow resistor 24 quickly increases since the minimum dimension 32 begins reducing toward the minimum dimension 40 thereby reducing the flow area therethrough and increasing the pressure drop associated with the fluid flow.

The biasing element 50 is selected to have a greater biasing force on the tubular 14 than the biasing member 22 has on the flow resistor 24. This assures that the flow resistor 24 moves before the tubular 14 moves. In fact, the biasing element 50 can be selected such that the tubular 14 does not move unless the movable member 18 has been moved to the second position 28 wherein the forces generated by the flowing fluid are substantially greater due to the flow restriction created by the reduced flow area 44 formed by the movable member 18.

The biasing member 22 and the biasing element 50 are also selected to have sufficient biasing forces to reset both the flow resistor 24 and the tubular 14 to their original, non-flow actuated positions, as illustrated in FIG. 1 in response to cessation of fluid flow.

Figure 3:
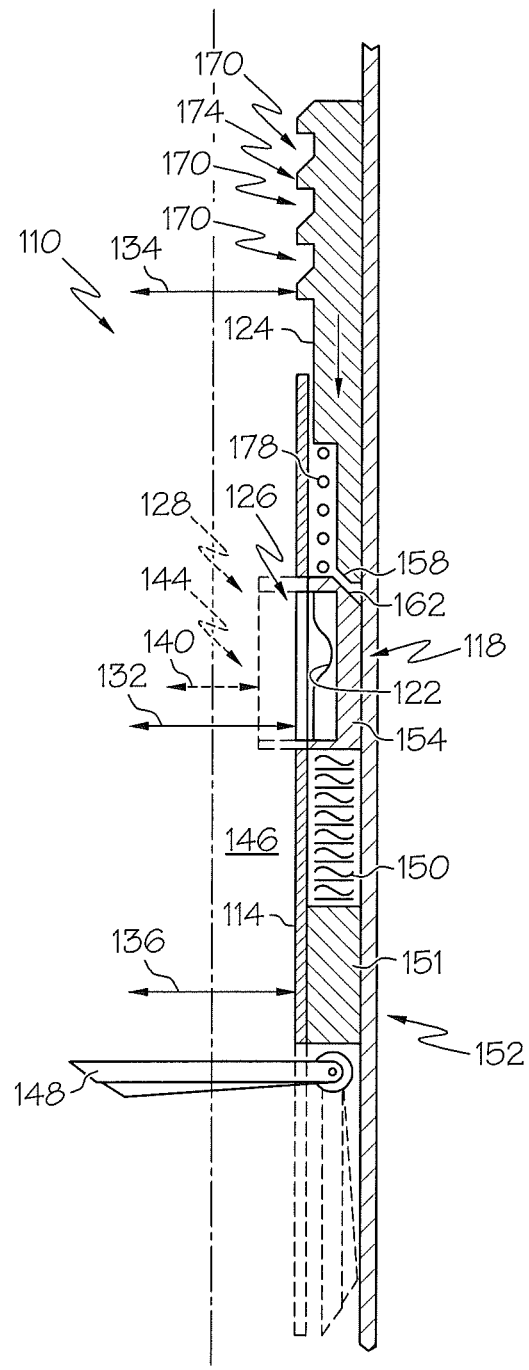
FIG. 3 depicts a partial cross sectional view of another flow-actuated actuator disclosed herein shown in a non-actuated position.

Referring to FIG. 3, an alternate embodiment of a flow-actuated actuator 110 disclosed herein is illustrated. The flow-actuated actuator 110 includes, tubular 114, a movable member 118, a biasing member 122 and a flow resistor 124. The movable member 118 is movable between a first position 126, as illustrated herein in solid lines, and a second position 128, as illustrated herein in phantom lines. As with the first embodiment, the second position 128 may also be referred to as the actuating position. The biasing member 122, depicted herein as a leaf spring, biases the movable member 118 toward the first position 126. In the first position 126 neither a minimum radial dimension 132 of the movable member 118 nor a minimum radial dimension 134 of the flow resistor 124 is smaller than a smallest radial dimension 136 of the tubular 114. However, in the second position 128, the movable member 118 has a minimum radial dimension 140 that is substantially smaller than the smallest radial dimension 136 of the tubular 114. As such, the movable member 118 when in the second position 128 forms a reduced flow area 144 at the minimum radial dimension 140 in comparison to the minimum flow area 146 of the tubular 114. This reduced flow area 144 creates a pressure drop due to fluid flowing therethrough and consequently an urging force on the actuator 110 that is proportional to the fluid flow. This urging force can be used to move the tubular 114 and actuate a tool such as in opening a flapper 148 sealedly engaged with an outlet end 152 of the tubular 114, for example. A biasing element 150 that biases the tubular 114 relative to a housing 151, illustrated herein as a series of wave springs, is longitudinally compressed to a smaller longitudinal length when the tubular 114 is moved due to the urging forces.

In this embodiment, the movable member 118 has a plurality of orifice dogs 154 substantially oriented symmetrically about a longitudinal axis of the tubular 114. The orifice dogs 154 are moved from the first position 126 to the second position 128 in response to longitudinal movement of the flow resistor 124. This longitudinal movement of the flow resistors 124 causes ramped extenders 158 thereon to engage ramped surfaces 162 on the orifice dogs 154 moving the orifice dogs 154 to the second position 128 against the biasing of the biasing members 122 to form the minimum dimension 140.

A plurality of flow-resisting elements 170 on the flow resistor 124, illustrated herein as annular grooves on an inner surface 174 of the flow resistor 124, interacts with the fluid flow to create an urging force on the flow resistor 124 that is proportional to the fluid flow. The annular groove flow-resisting elements 170, in this embodiment are formed without reducing the minimum dimension 134 of the flow resistor 124. Doing so allows full bore access through the actuator 110, as mentioned above, without the need to remove the actuator 110 from the well bore. A biasing member 178 is set to bias the flow resistor 124 against a direction of the fluid flow. A biasing force of the biasing member 178 is selected to permit the flow resistor 124 to move relative to the tubular 114 with relatively little urging force applied to the flow resistor 124. Once the flow resistor 124 begins moving toward the tubular 114 the urging force on the orifice dogs 154 generated by the fluid flow quickly increases since the minimum dimension 132 begins reducing toward the minimum dimension 140 thereby reducing the flow area therethrough and increasing the pressure drop associated with the fluid flow.

The biasing element 150 is selected to have a greater biasing force on the tubular 114 than the biasing member 178 has on the flow resistor 124. This assures that the flow resistor 124 moves before the tubular 114 moves. In fact, the biasing element 150 can be selected such that the tubular 114 does not move unless the movable member 118 has been moved to the second position 128 wherein the forces generated by the flowing fluid are substantially greater due to the flow restriction created by the reduced flow area 144 formed by the movable member 118.

The biasing member 122, the biasing element 150 and the biasing member 178 are also selected to have sufficient biasing forces to reset the orifice dogs 154, the tubular 114, and the flow resistor 124 to their original, non-flow actuated positions, as illustrated in solid lines in FIG. 3 in response to cessation of fluid flow.

Figure 4:
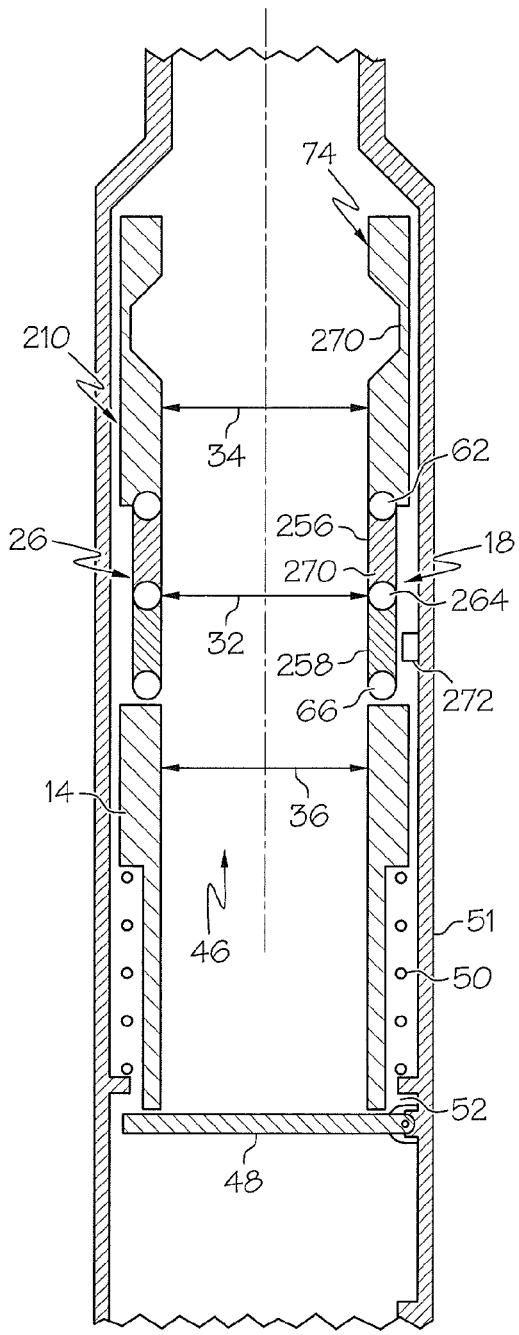
FIG. 4 depicts a partial cross sectional view of another actuator similar to that illustrated in FIG. 1 in a full bore position.
Figure 5:
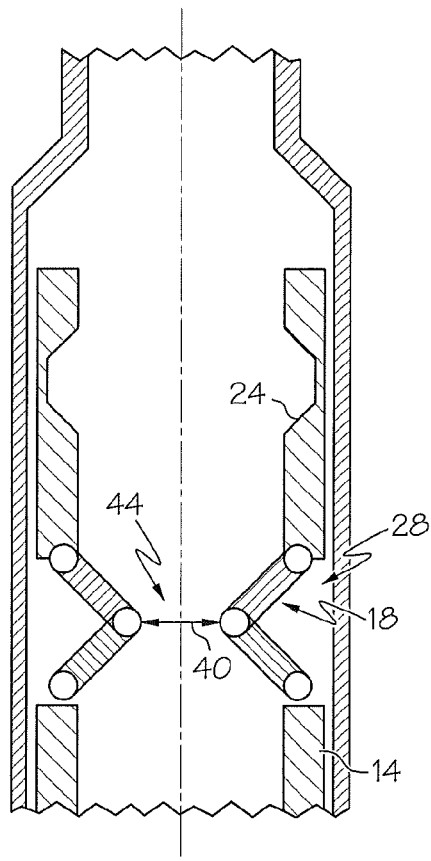
FIG. 5 depicts the actuator of FIG. 4 in the flow actuation position.

Referring to FIG. 4 and FIG. 5 another embodiment of a flow-actuated actuator is disclosed. This embodiment, it will be appreciated, is similar in appearance to the embodiment represented in FIG. 1 and FIG. 2 but is structurally unique resulting operational distinctions allowing for use in different applications. In order to promote efficiency in description and improvement in understanding, numerals used in the description of FIG. 1 are mirrored in this discussion as 200 series numerals. Further, only numerals that represent a change in structure or use of structure relative to the FIG. 1 embodiment are addressed with respect to this embodiment. The flow interacting detail 70 from the FIG. 1 embodiment becomes shifting profile 270 in the FIG. 4 embodiment. This profile is intended to be engageable by a shifting tool (not shown) that is run in the hole for the specific purpose of shifting the flow actuated actuator 210 to the operable position (illustrated in FIG. 5) or to the full bore position (illustrated in FIG. 4). In this embodiment then there is no required threshold fluid flow for frictional interaction with a flow interacting detail 70 as none is needed. Operation of the actuator 210 occurs (after mechanical shifting) based solely on the pressure drop created by the minimum dimension 40 (FIG. 5). Also because of the mechanical shifting of this embodiment, the biasing member 22 from the FIG. 1 embodiment is omitted.

Further distinguishing this embodiment from the FIG. 1 embodiment is the second pivot 264. In the first embodiment the pivot is a normal hinge type pivot while in this embodiment the pivot 264 includes an eccentricity 270 such that the links 256 and 258 will want to stay in either the full bore position (FIG. 4) or the actuatable position (FIG. 5) but that they will not want to stay in a position between those two. In other words, the links are configured to be bistable with respect to position. This operation can be accomplished using the eccentric cam as noted or by an overcentering arrangement or by other similar arrangements. In other respects, the actuator 210 is similar to actuator 10 as described above and the balance of the numerals used in FIGS. 4 and 5 are identical to those used in FIGS. 1 and 2.

In the event that the actuator 210 is required to reassume a full bore position, a shifting tool (not shown) is run to the actuator 210, engaged with profile 270 and pulled to stretch out the links 256 and 258. In order to ensure that the actuator or part thereof is not simply pulled uphole upon an uphole pull from the shifting tool, a shoulder 272 is included or other such member to prevent uphole movement of the actuator 210 thereby enabling the stretching out of the links.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A variable flow resistant actuating system, comprising:
a housing defining a full bore radial dimension;
a tubular positionable within the housing having a smallest radial dimension no smaller than the full bore radial dimension;
at least one member in operable communication with the tubular positioned downstream of the housing, having a radially movable portion movable between a first position and a second position, the radially movable portion having a smallest radial dimension no less than the full bore radial dimension in the first position and having a smallest radial dimension smaller than the full bore radial dimension in the second position, the radially movable portion comprising:
at least two links being pivotally attached to one another at a pivot, the pivot being positioned at at least the full bore radial dimension when the radially movable member is in the first position and the pivot being positioned at a dimension smaller than the full bore radial dimension when the radially movable member is in the second position.

2. The variable flow resistant actuating system of claim 1, wherein the links are configured to be bistable with respect to position.

3. The variable flow resistant actuating system of claim 1, wherein the links and the pivot comprise a cam profile to preferentially locate the links in two possible positions.

4. The variable flow resistant actuator, of claim 1, wherein the tubular is a flow tube of a valve.

5. The variable flow resistant actuator, of claim 1, wherein the at least one member is a plurality of members that are substantially symmetrical with respect to a longitudinal axis of the tubular.

6. The variable flow resistant actuator, of claim 1, wherein radial dimensions of ends of the at least two links opposing ends attached to the pivot remain substantially unchanged as the movable member moves between the first position and the second position.

7. A flow-actuated actuator, comprising:
a tubular with a full bore flow passageway defining a full bore radial dimension; and
at least one movable member in operable communication with the tubular, the at least one movable member being movable relative to the tubular between at least a first position having a smallest radial dimension no less than the full bore radial dimension and a second position having a smallest radial dimension smaller than the full bore radial dimension, the at least one movable member configured to reposition from the first position to the second position in response to an increase in fluid flowing through the flow-actuated actuator, the flow-actuated actuator being configured to move a separate member in response to fluid flow therethrough, the flow-actuated actuator having a minimum radial dimension that creates no greater impedance to a tool running therethrough than a minimum radial dimension of a housing positioned upstream of the actuator within which the flow-actuated actuator is configured to be positioned, when the flow-actuated actuator is in the first position; and
a biasing element that biases the tubular in a direction against an urging force generated in response to the increase in fluid flowing through the flow-actuated actuator the biasing element creating a biasing force selected to be sufficient to prevent movement of the flow tube when the at least one movable member is in the first position but insufficient to prevent movement of the flow tube when the at least one movable member is in the second position.

8. The flow-actuated actuator of claim 7 wherein the at least one movable member is configured to move between the first position and the second position responsive to mechanical input through a shifting profile.

9. The flow-actuated actuator of claim 7 wherein the at least one movable member is configured to move from the first position to the second position responsive to fluid flow therethrough.

10. The flow-actuated actuator of claim 7, wherein the biasing member biases the at least one movable member toward the first position.

11. The flow-actuated actuator of claim 7, further comprising links.

12. The flow-actuated actuator of claim 7, wherein the tubular is a flow tube.

13. The flow-actuated actuator of claim 12, further comprising a flapper that is sealable to an outlet end of the flow tube when the flow tube is positioned full travel in a direction of bias from the biasing element.

14. The flow-actuated actuator of claim 12, further comprising a flapper that is locked open by the flow tube when the flow tube is positioned fully in a direction against the bias of the biasing element.

15. The flow-actuated actuator of claim 7, further comprising at least one flow resistor having a flow passageway with a flow area no smaller than the first flow area.

16. The flow-actuated actuator of claim 15, wherein the at least one flow resistor has at least one flow interacting detail thereon.

17. The flow-actuated actuator of claim 15, wherein the at least one flow resistor is on an upstream member that is upstream of the tubular as defined by the fluid flow.

18. The flow-actuated actuator of claim 17, wherein the at least one flow interacting detail is an annular groove on a radially inwardly facing surface of the upstream member.

19. A method of actuating a tubular, comprising:
flowing fluid through a housing defining a full bore radial dimension;
flowing fluid through the tubular positioned within the housing;
moving a flow resistor positioned downstream of the housing with a force generated by an increase in the flowing fluid acting on the flow resistor;
moving a movable member in operable communication with the tubular from a first position having a smallest radial dimension no less than the full bore radial dimension to a second position having a smallest radial dimension smaller than the full bore radial dimension in response to the moving of the flow resistor, the second position having more resistance to fluid flow than the first position, the moving member having a pivot positioned between two links the pivot moving from a dimension at least as large as the full bore radial dimension when the movable member is in the first position to a position smaller than the full bore radial dimension when the movable member is in the second position; and
moving the tubular relative to the housing with an urging force proportional to fluid flow acting on the movable member in the second position.

20. The method of actuating a tubular of claim 19, further comprising presenting a smaller flow area for fluid flow with the movable member in the second position than when in the first position.

21. The method of actuating a tubular of claim 19, further comprising resisting the moving of the flow resistor with a biasing member.

* * * * *